US010375674B2

(12) United States Patent
Gustavsson et al.

(10) Patent No.: US 10,375,674 B2
(45) Date of Patent: Aug. 6, 2019

(54) ARCHITECTURE AND METHOD IN A WIRELESS COMMUNICATION NETWORK

(71) Applicant: Huawei Technologies Co., Ltd., Shenzhen (CN)

(72) Inventors: Anders Gustavsson, Lindome (SE); Björn Sihlbom, Frolunda (SE); Mats Hogberg, Partille (SE); Mattias Gustafsson, Kista (SE); Martin Alm, Kista (SE); Mats Andersson, Gothenburg (SE)

(73) Assignee: Hauwei Technologies Co., Ltd., Shenzhen (CN)

( * ) Notice: Subject to any disclaimer, the term of this patent is extended or adjusted under 35 U.S.C. 154(b) by 337 days.

(21) Appl. No.: 14/757,767

(22) Filed: Dec. 23, 2015

(65) Prior Publication Data

US 2016/0128023 A1 May 5, 2016

Related U.S. Application Data

(63) Continuation of application No. PCT/EP2013/063390, filed on Jun. 26, 2013.

(51) Int. Cl.
*H04B 17/382* (2015.01)
*H04W 72/02* (2009.01)
(Continued)

(52) U.S. Cl.
CPC .......... *H04W 72/02* (2013.01); *H04B 7/0413* (2013.01); *H04B 7/0452* (2013.01);
(Continued)

(58) Field of Classification Search
None
See application file for complete search history.

(56) References Cited

U.S. PATENT DOCUMENTS

| 2007/0142089 | A1* | 6/2007 | Roy | H04B 7/0848 |
| | | | | 455/562.1 |
| 2008/0090575 | A1* | 4/2008 | Barak | H04W 16/10 |
| | | | | 455/444 |

(Continued)

OTHER PUBLICATIONS

Ng et al., "Fulfilling the Promise of Massive MIMO with 2D Active Antenna Array," GC'12 Workshop: International Workshop on Emerging Technologies for LTE-Advanced and Beyond 4G, pp. 691-696, Institute of Electrical and Electronics Engineers, New York, New York (2012).

(Continued)

*Primary Examiner* — Nicholas Sloms
(74) *Attorney, Agent, or Firm* — Leydig, Voit & Mayer, Ltd.

(57) ABSTRACT

Radio network node comprises a plurality of antenna sub arrays, forming a multiple antenna array which is configured for beamforming, spatial multiplexing and Multiple Input Multiple Output, MIMO, transmission/reception, and further comprising an antenna base band processing unit and a central base band processing unit. The radio network node further comprises a plurality of antenna active modules, wherein each active antenna module is connected to one of the antenna sub arrays, comprised in the multiple antenna array, and wherein each active antenna module is configured for pre-processing of signals over the respective antenna sub array, before any forwarding of signals is made to the central base band processing unit.

18 Claims, 4 Drawing Sheets

(51) Int. Cl.
*H04B 7/0452* (2017.01)
*H04B 7/0456* (2017.01)
*H04B 7/06* (2006.01)
*H04B 7/0413* (2017.01)

(52) U.S. Cl.
CPC ......... *H04B 7/0456* (2013.01); *H04B 7/0617* (2013.01); *H04B 7/0697* (2013.01); *H04B 17/382* (2015.01)

(56) References Cited

U.S. PATENT DOCUMENTS

| | | | | |
|---|---|---|---|---|
| 2013/0028341 A1* | 1/2013 | Ayach | ............... | H04B 7/0478 375/267 |
| 2014/0071838 A1* | 3/2014 | Jia | ............... | H04B 7/04 370/252 |
| 2014/0073337 A1* | 3/2014 | Hong | ............... | H04W 16/28 455/452.1 |
| 2014/0079097 A1* | 3/2014 | Rudrapatna | ............... | H04B 7/0617 375/219 |

OTHER PUBLICATIONS

Rong et al., "Large Scale MIMO Transmission Technology in the Architecture of Cloud Base-Station," G2'12 Workshop: International Workshop on Cloud Base-Station and Large-Scale Cooperative Communications, pp. 255-260, Institute of Electrical and Electronics Engineers, New York, New York (2012).

Hoydis et al., "Massive MIMO: How many antennas do we need?," (2011).

Choi et al., "Noncoherent Trellis-Coded Quantization for Massive MIMO Limited Feedback Beamforming," (2013).

Studer et al., "PAR-Aware Multi-User Precoder for the Large-Scale MIMO-OFDM Downlink," pp. 806-810, Institute of Electrical and Electronics Engineers, New York, New York (2012).

* cited by examiner

ARCHITECTURE AND METHOD IN A WIRELESS COMMUNICATION NETWORK

CROSS REFERENCE

This application is a continuation of International Patent Application No. PCT/EP2013/063390, filed on Jun. 26, 2013, which is incorporated herein by reference in its entirety.

FIELD OF INVENTION

Implementations described herein generally relate to a radio network node and a method in a radio network node. In particular, a mechanism for communicating wireless signals in antenna streams in a multiple antenna environment is described.

BACKGROUND OF INVENTION

A User Equipment (UE), also known as a mobile station, wireless terminal and/or mobile terminal is enabled to communicate wirelessly in a wireless communication network, sometimes also referred to as a cellular radio system. The communication may be made, e.g., between UEs, between a UE and a wire connected telephone and/or between a UE and a server via a Radio Access Network (RAN) and possibly one or more core networks.

The wireless communication may comprise various communication services such as voice, messaging, packet data, video, broadcast, etc.

The UE may further be referred to as mobile telephone, cellular telephone, computer tablet or laptop with wireless capability, etc. The UE in the present context may be, for example, portable, pocket-storable, hand-held, computer-comprised, or vehicle-mounted mobile devices, enabled to communicate voice and/or data, via the radio access network, with another entity, such as another UE or a server.

The wireless communication network covers a geographical area which is divided into cell areas, with each cell area being served by a radio network node, or base station, e.g., a Radio Base Station (RBS) or Base Transceiver Station (BTS), which in some networks may be referred to as "eNB", "eNodeB", "NodeB" or "B node", depending on the technology and/or terminology used.

Sometimes, the expression "cell" may be used for denoting the radio network node itself. However, the cell may also in normal terminology be used for the geographical area where radio coverage is provided by the radio network node at a base station site. One radio network node, situated on the base station site, may serve one or several cells. The radio network nodes may communicate over the air interface operating on radio frequencies with any UE within range of the respective radio network node.

In some radio access networks, several radio network nodes may be connected, e.g., by landlines or microwave, to a Radio Network Controller (RNC), e.g., in Universal Mobile Telecommunications System (UMTS). The RNC, also sometimes termed Base Station Controller (BSC), e.g., in GSM, may supervise and coordinate various activities of the plural radio network nodes connected thereto. GSM is an abbreviation for Global System for Mobile Communications (originally: Groupe Special Mobile).

In 3rd Generation Partnership Project (3GPP) Long Term Evolution (LTE) radio network nodes, which may be referred to as eNodeBs or eNBs, may be connected to a gateway, e.g., a radio access gateway, to one or more core networks.

In the present context, the expressions downlink, downstream link or forward link may be used for the transmission path from the radio network node to the UE. The expression uplink, upstream link or reverse link may be used for the transmission path in the opposite direction, i.e., from the UE to the radio network node.

Beyond 3G mobile communication systems, such as e.g., 3GPP LTE, offer high data rate in the downlink by employing multiple antenna systems utilising Multiple-Input and Multiple-Output (MIMO).

Massive MIMO is a recently emerged technology that uses large Antenna Arrays Systems (AAS) with individual transceivers to improve throughput of wireless communication systems. Massive MIMO may sometimes also be referred to as "very large MIMO system", or "large-scale antenna system".

Antenna arrays with large number of elements enable the increase in capacity by utilising spatial beam forming and spatial multiplexing. The benefit of these large arrays is the ability to spatially resolve and separate received and transmitted signals with very high resolution.

The resolution is determined by the number of antenna elements, and their spacing. Typically the number of transceivers may be as high as 10× the maximum rank of the system. The rank is defined as the total number of parallel (same time and frequency) transmissions, including both wanted and unwanted signals (i.e. interference). Massive MIMO is sometimes loosely defined as a system using comprising 100 or more transceivers.

Basically, the more antennas the transmitter/receiver is equipped with in massive MIMO, the more the possible signal paths, the better the performance in terms of data rate and link reliability.

Advantages with massive MIMO comprise improved UE detection. Further, thanks to the high resolution of massive MIMO, the transmit power per UE may be reduced.

Both single user MIMO with many layers and multi user MIMO will increase the network performance and system capacity. Especially in the uplink, the radio network node will have the new freedom of spatial diversity to handle interference and increase the Signal Interference Noise Ratio (SINR). One major challenge to implement Massive MIMO technology will be that the number of antenna streams will increase with the number of elements. The many elements result in a significant increase in complexity, which has to be handled by the Hardware (HW) and Software (SW) architectures. For the user scheduling, the spatial domain exposes new parameters to be used in the many element AAS and increases the complexity even further for the user scheduling algorithms.

Further, accurate channel state information must be acquired to reap the benefits of additional antennas in massive MIMO. This poses, in particular in fast fading channels, a challenge as the number of antennas grows.

The complexity of baseband receive and transmit MIMO algorithms scales exponentially with number of antennas, leading to high requirements for computational ability, which may require additional dedicated hardware in form of very high capacity processing platforms for implementing massive MIMO. Further, computational complexity adds processing time, delaying the transmission/reception, and consume power, leading to high energy costs and additional heating.

Thus an implementation of the increased number of antenna elements would not be realistic due to the incremental increasing resources needed for base band processing; also the interface requirements would be out of scope.

It appears that massive MIMO requires further development for becoming feasible for practical implementation.

SUMMARY OF INVENTION

It is therefore an object to obviate at least some of the above mentioned disadvantages and to improve the performance in a wireless communication network.

According to a first aspect, the object is achieved by a radio network node configured for wireless communication with a user equipment in a wireless communication system in antenna streams. The radio network node comprises a plurality of antenna sub arrays, forming a multiple antenna array which is configured for beamforming, spatial multiplexing and MIMO, transmission/reception. Furthermore, the radio network node comprises an antenna base band processing unit and a central base band processing unit. The radio network node further comprises a plurality of antenna active modules, each connected to one of the antenna sub arrays, comprised in the multiple antenna array. Each active antenna module is configured for pre-processing of signals over the respective antenna sub array, before any forwarding of signals is made to the central base band processing unit.

According to a second aspect, the object is achieved by a method in a radio network node. The method is configured for wireless communication with a user equipment in a wireless communication system in antenna streams. The radio network node comprises a plurality of antenna sub arrays, forming a multiple antenna array which is configured for beamforming, spatial multiplexing and MIMO transmission/reception, and further comprising an antenna base band processing unit and a central base band processing unit. The method comprises receiving wireless signals from the user equipment. Also, the method further comprises spatial analysing the received signals in the antenna base band processing unit. In addition, the method furthermore also comprises selecting the strongest signals from one, several or all antenna sub-arrays, based on the spatial analysis. In further addition, the method also comprises isolating selected signals received from the user equipment. Also, moreover, the method furthermore comprises forwarding the isolated signals to the central base band processing unit.

By performing pre-processing at the antenna array system, before forwarding signals to the central base band processing unit, the computational complexity associated with massive MIMO is reduced. A way of mapping the physical antennas into ideal logical antennas is presented in some embodiments. Thereby, complexity of baseband reception- and transmission MIMO algorithms is further simplified, leading to less computation and also less downlink interference. Further, reuse of legacy systems, including both implementations and governing standards such as e.g. LTE is facilitated. The pre-filtering at the antenna array system is transparent from baseband point of view.

Thereby an improved performance within the wireless communication network is provided.

Other objects, advantages and novel features of the embodiments of the invention will become apparent from the following detailed description.

BRIEF DESCRIPTION OF THE DRAWINGS

Embodiments of the invention are described in more detail with reference to attached drawings illustrating examples of embodiments of the invention in which.

DETAILED DESCRIPTION OF INVENTION

Embodiments of the invention described herein are defined as a radio network node and a method in a radio network node, which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
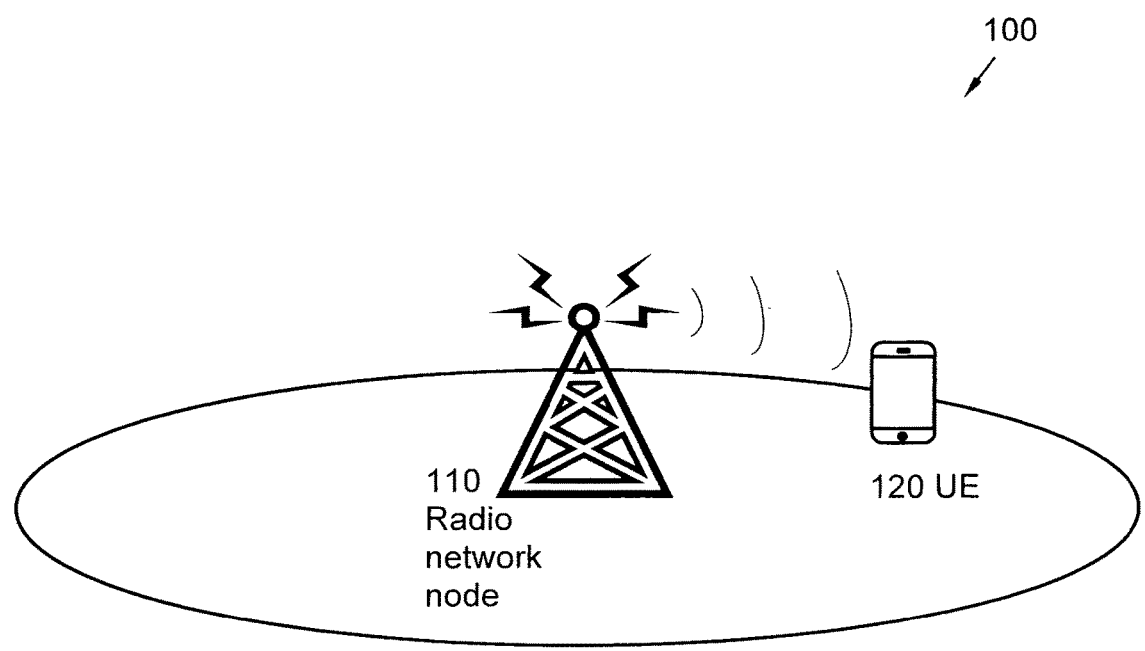
FIG. 1 is a block diagram illustrating a wireless communication network according to some embodiments.

FIG. 1 is a schematic illustration over a wireless communication network 100 comprising a radio network node 110 and a User Equipment (UE) 120.

The wireless communication network 100 may at least partly be based on radio access technologies such as, e.g., 3GPP LTE, LTE-Advanced, Evolved Universal Terrestrial Radio Access Network (E-UTRAN), Universal Mobile Telecommunications System (UMTS), Global System for Mobile Communications (originally: Groupe Special Mobile) (GSM)/Enhanced Data rate for GSM Evolution (GSM/EDGE), Wideband Code Division Multiple Access (WCDMA), Time Division Multiple Access (TDMA) networks, Frequency Division Multiple Access (FDMA) networks, Orthogonal FDMA (OFDMA) networks, Single-Carrier FDMA (SC-FDMA) networks, Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies, e.g., CDMA2000 1× RTT and High Rate Packet Data (HRPD), just to mention some few options. The expressions "wireless communication network" and "wireless communication system" may within the technological context of this disclosure sometimes be utilised interchangeably.

The wireless communication network 100 may be configured to operate according to the Time Division Duplex (TDD) and/or the Frequency Division Duplex (FDD) principle, according to different embodiments.

TDD is an application of time-division multiplexing to separate uplink and downlink signals in time, possibly with a Guard Period (GP) situated in the time domain between the uplink and downlink signalling. FDD means that the transmitter and receiver operate at different carrier frequencies.

Further, the wireless communication network 100 is configurable for massive MIMO and AAS, according to some embodiments.

The purpose of the illustration in FIG. 1 is to provide a simplified, general overview of the wireless communication network 100 and the involved methods and nodes, such as the radio network node 110 and UE 120 herein described, and the functionalities involved. The methods, radio network node 110 and UE 120 will subsequently, as a non-limiting example, be described in a 3GPP LTE/LTE-Advanced environment, but the embodiments of the disclosed methods, radio network node 110 and UE 120 may operate in a wireless communication network 100 based on another access technology such as, e.g., any of the above already enumerated. Thus, although the embodiments of the invention are described based on, and using the lingo of, 3GPP LTE systems, it is by no means limited to 3GPP LTE.

The illustrated wireless communication network 100 comprises the radio network node 110, which may send radio signals to be received by the UE 120.

It is to be noted that the illustrated network setting of one radio network node 110 and one UE 120 in FIG. 1 is to be regarded as a non-limiting example of an embodiment only. The wireless communication network 100 may comprise any other number and/or combination of radio network nodes 110 and/or UEs 120. A plurality of UEs 120 and another configuration of radio network nodes 110 may thus be involved in some embodiments of the disclosed invention.

Thus whenever "one" or "a/an" UE 120 and/or radio network node 110 is referred to in the present context, a plurality of UEs 120 and/or radio network nodes 110 may be involved, according to some embodiments.

The radio network node 110 may according to some embodiments be configured for downlink transmission and may be referred to, respectively, as e.g., a base station, NodeB, evolved Node Bs (eNB, or eNode B), base transceiver station, Access Point Base Station, base station router, Radio Base Station (RBS), micro base station, pico base station, femto base station, Home eNodeB, sensor, beacon device, relay node, repeater or any other network node configured for communication with the UE 120 over a wireless interface, depending, e.g., of the radio access technology and/or terminology used.

The UE 120 may correspondingly be represented by, e.g. a wireless communication terminal, a mobile cellular phone, a Personal Digital Assistant (PDA), a wireless platform, a mobile station, a tablet computer, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the radio network node 110, according to different embodiments and different vocabulary.

Some embodiments of the invention define a modular implementation approach, and make it possible to reuse legacy systems such as e.g. standards, algorithms, implementations, components and products. The modular architecture also scales up/down to support implementations on e.g. small cell BTS products.

The radio network node architecture according to some embodiments is adapted for a many element Antenna Array System (AAS). According to some embodiments, the architecture comprises antenna sub arrays, which in turn comprises one or several passive antenna elements. The antenna sub arrays are connected to one Active Antenna Module (AAM). An Antenna Base Band (ABB) processing unit may be divided into one or several sub levels. Each ABB is connected to several or all AAMs. The herein described architecture comprising antenna sub arrays and antenna base band unit, for the many element AAS architecture gives the possibility to use part of the array (antenna sub arrays) for scheduling of UE 120 if this is advantageous for the capacity and efficient use of Radio-Frequency (RF) power. Hereby implementation of a massive MIMO technology solution is enabled in the radio network node 110. This will be further discussed under the presentation of FIG. 2.

Figure 2:
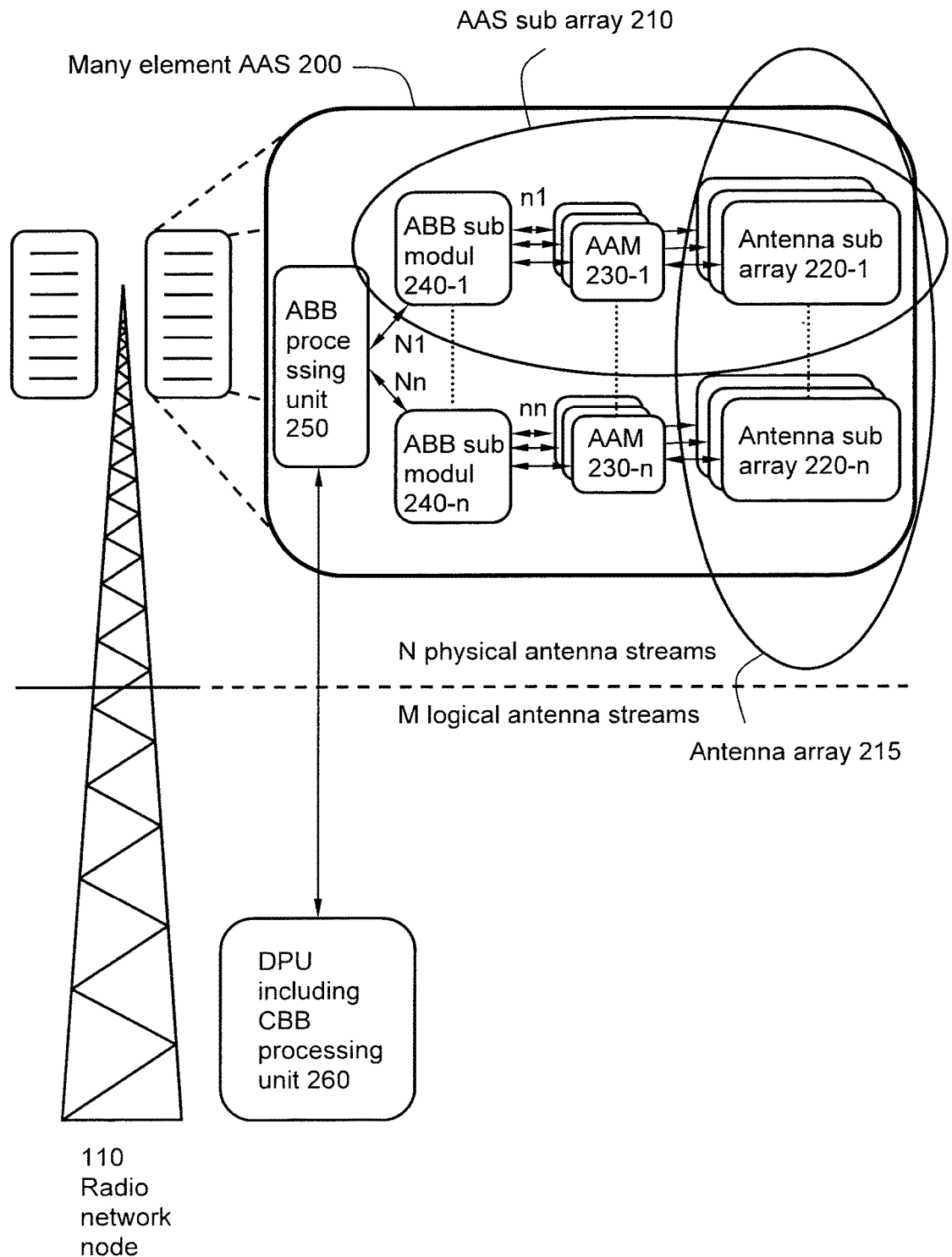
FIG. 2 is a block diagram illustrating a radio network node architecture according to an embodiment.

FIG. 2 discloses an embodiment of the radio network node 110, and encompasses also the scenario with distributed ABB functionality connected to the same mast head unit ABB. The radio network node 110 comprises, or is connected to, a many element AAS 200. The many element AAS 200 in turn comprises an antenna array 215; or multiple antenna array as it also may be referred to, which is configurable for massive MIMO.

The multiple antenna array 215 comprises a plurality of antenna sub arrays 220, or multiple antenna elements, such as e.g. 100 antenna elements, just to mention an example. The physical number of antennas may typically be e.g. ten times the number of spatial layers, which sometimes also may be referred to as ranks, or logical antennas.

The multitude of antenna elements 220 may in some embodiments be mounted at a distance from each other, within the multiple antenna array 215, such that some, several or even all of the antenna elements 220 in the multiple antenna array 215 may be able to receive the same signal from the UE 120.

The radio network node 110 and the many element AAS 200 further comprises a plurality of AAMs 230, where each AAM 230 is connected to an antenna sub array 220. The AAM 230 may be defined as one transmission or reception radio function for FDD or TDD in different embodiments. Such receiver functions may comprise e.g. Automatic Gain Controlling (AGC), i.e. Digital and/or Analogue AGC; digital channel filtering; Analogue/Digital (A/D) conversion; RF down conversion; low noise amplification and RF receiver band filtering (RX band filter and part of duplex filter). Corresponding transmitter functionalities may comprise e.g. CFR and pulse forming; D/A conversion; RF up conversion; PA and linearization; RF transmitter band filtering (TX band filter and part of duplex filter).

In some embodiments, the AAMs 230 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilised expression "processing circuit" may thus represent a processing circuitry comprising a plurality of processing circuits, such as, e.g., any, some or all of the ones enumerated above.

The AAMs 230 are connected to an ABB sub module 240. The ABB sub module 240 may be configured for certain sub level antenna base band pre-processing such as e.g., in the uplink, determining uplink UE's antenna spatial behaviour; reducing number of antenna streams from n to N; communication control and Integrated Quadrature interface (IQ I/F). Corresponding pre-processing in the downlink may comprise e.g. antenna weighting and mapping for cell specific signal and channels and per downlink scheduled UE and also communication control and IQ I/F.

In some embodiments, the ABB sub module 240 may comprise one or more instances of a processing circuit, i.e. a CPU, a processing unit, a processing circuit, a processor, an ASIC, a microprocessor, or other pro-cessing logic that may interpret and execute instructions. The herein utilised expression "processing circuit" may thus represent a processing circuitry comprising a plurality of processing circuits, such as, e.g., any, some or all of the ones enumerated above.

Each such ABB sub module 240 is further connected to an ABB processing unit 250. The interface between the ABB processing unit 250 and the AAMs 230 may be in the frequency domain or in the time domain in different embodiments. The ABB processing unit 250 is configured to reduce the number of physical antenna streams N to the number of logical antenna streams M by a pre-processing process. The number of antenna streams N may be determined by the rank M of the transmission. The number of physical antenna streams N may be determined by the requirement of spatial resolution. Typically: n>>M.

Such pre-processing in the ABB processing unit 250 may comprise, in the uplink, determination of uplink UE's best antenna sub array(s); determination of uplink UE's antenna spatial behaviour; Reduction of the number of antenna streams from N to M; Control, L2 and IQ I/F in communication and manage an uplink/downlink interface. The corresponding pre-processing in the downlink may comprise antenna weighting and mapping per cell and per downlink scheduled UE; L2 scheduler handling; Control, L2 and IQ I/F in communication and manage an uplink/downlink interface.

In some embodiments, the ABB processing unit 250 may comprise one or more instances of a processing circuit, i.e. a CPU, a processing unit, a processing circuit, a processor, an ASIC, a microprocessor, or other pro-cessing logic that may interpret and execute instructions. The herein utilised expression "processing circuit" may thus represent a processing circuitry comprising a plurality of processing circuits, such as, e.g., any, some or all of the ones enumerated above.

Furthermore, the described elements of the many element AAS 200 may be divided into sub arrays 210. Each such sub array 210 comprises one set of antenna sub arrays 220, one set of AAMs 230 and one ABB sub module 240.

In the prior art solutions, the antenna stream from each antenna and transceiver is mapped directly to one Base Band (BB) transceiver, i.e. there is a 1:1 relationship between the BB processing resources and antennae resources. Thus one physical antenna stream N equals one logical M antenna stream.

Thanks to pre-processing performable in the ABB sub modules 240 and/or the ABB processing unit 250 a pre-filtering of received signals may be made. Thereby, it is possible to map some significant clusters of signals N to logical antennas M.

The number of logical antennas M may be smaller, or much smaller, than the number of antenna elements 220 comprised in the multiple antenna array 215.

The pre-processed signals are forwarded to the central base band processing unit 260, which comprises a Digital Processing Unit (DPU). In the central base band processing unit 260, the processing of the forwarded signals is performed.

Signals received in the uplink may be received from the UE 120, or possibly from an interferer. The interferer may comprise another UE, or any other arbitrary device configured for transmission of wireless signals.

It is to be noted that, according to some embodiments, different ABB sub modules 240 may be connected to the ABB processing unit 250 and the UE 120, due to shadowing effects and other signal propagation disturbances. Thereby different antenna elements in different antenna sub arrays 220 may receive signals from the UE 120, having a signal strength/signal quality exceeding a threshold value. Thus one UE 120 may have several connections N1-Nn to the ABB processing unit 250 distributed via a plurality ABB sub modules 240 and/or via a plurality of antenna sub arrays 220. Correspondingly, some physical antenna streams N may be filtered out due to low signal strength/signal quality, according to some embodiments.

The many element AAS radio network node architecture illustrated in FIG. 2 provides a platform to extract the maximum network gain from spatial processing, or at least an improved gain. It connects a modular implementation of an AAS with a split base band implementation. Further, modular pre-processing of antenna stream data is supported and mapping of logical antennas M to physical antennas N is performed. Thereby, by performing pre-processing at the many element AAS 200, the amount of data that is forwarded to the central base band processing unit 260 may be reduced.

Figure 3:
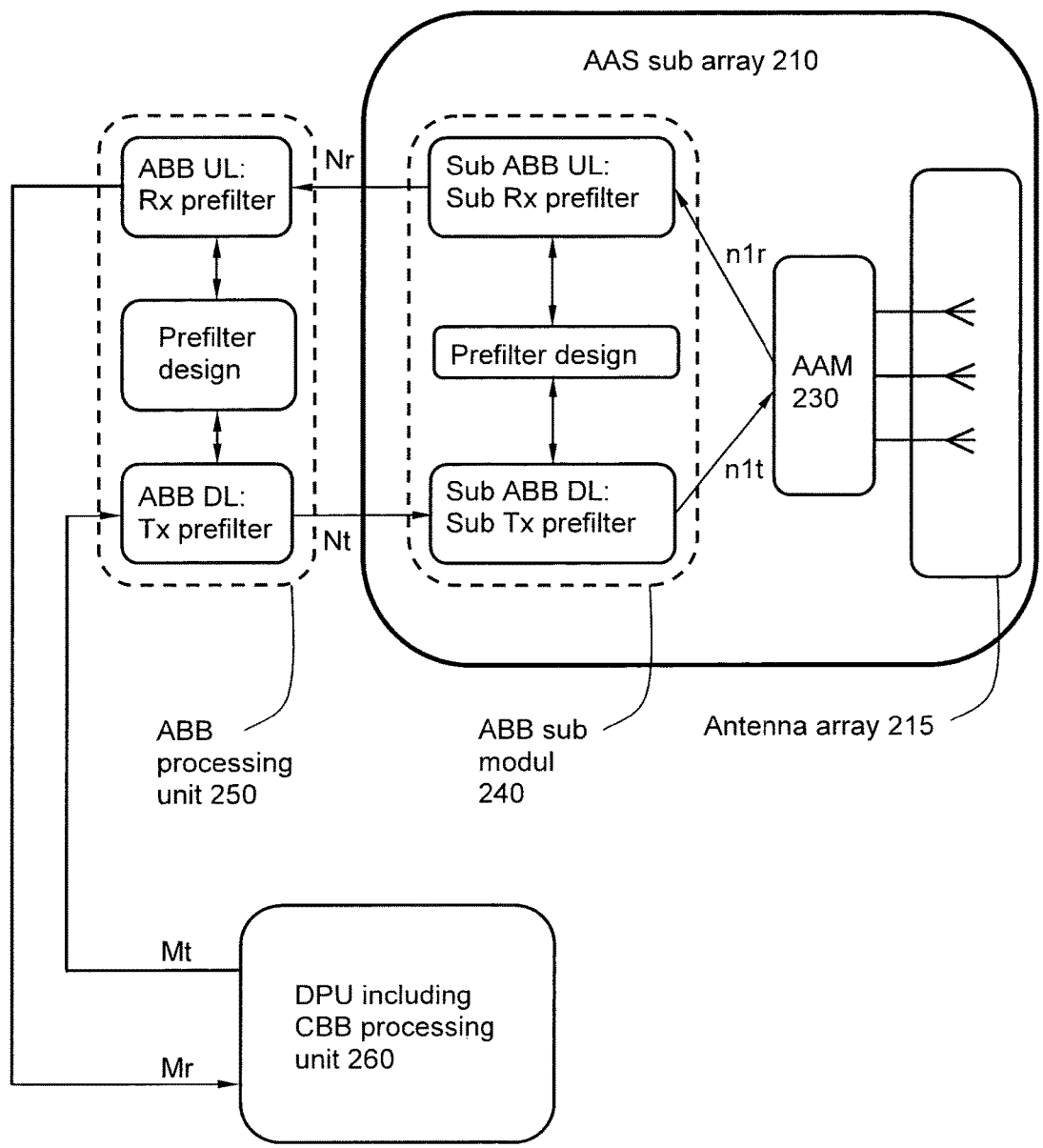
FIG. 3 is a block diagram illustrating a radio network node architecture according to an embodiment.

FIG. 3 discloses an embodiment of the radio network node 110, similar to, or even identical with the previously described radio network node architecture of FIG. 2, which is configured for massive MIMO.

The pre-filtering at the many element AAS 200, e.g. in the AAM 230, in the ABB sub modules 240 and/or the ABB 250 is used to determine spatial aspects for received signal at one antenna sub-array 210 per UE 120, separated by frequency and time allocations.

In the downlink, the pre-filter may be used based on the reciprocal of uplink and downlink spatial behaviours of the radio channel in some embodiments.

The above described pre-filter design is intended to be reused for both uplink reception and downlink transmission, regardless if the directions are separated by time (as TDD in TDMA), frequency (as FDD in FDMA), code (as in CDMA) or space, as may be the case.

The described many element AAS modular architecture enables implementation of single user and multi user MIMO technology.

The new architecture uses antenna sub arrays 220, comprising one or several passive antenna elements. The antenna sub arrays 220 are connected to the AAM 230, a RF radio module.

The ABB processing unit 250 may be divided to one or several sub levels, ABB sub modules 240 in different embodiments. Each ABB sub module 240 may be connected to a number or all AAMs 230. Thus all AAMs 230 are connected to the ABB sub modules 240, which in turn is connected to the ABB processing unit 250.

Thereby, n-N-M mapping between antenna sub panel 220/AAM 230/ABB sub module 240/ABB 250 and CBB processing unit 260 is performed in order to enable high spatial resolution of an large array without increasing the number of antenna streams and/or increase complexity. Further, the use of antenna sub arrays 210 is enabled in order to simplify spatial detection algorithm. Further, it is possible using antenna sub arrays 210 for L2 scheduling by allocating UE 120 to one or several antenna sub arrays 210.

In some embodiments, each antenna sub-array 220, which may comprise 1 to z elements, where z is an arbitrary positive integer, is connected to one AAM 230. The antenna sub-arrays 220 may receive uplink signals from the UE 120. The AAM 230 may perform AD/DA conversion of the received signals, as well as e.g. carrier modulation/demodulation, TX power amplification and filtering, RX low noise amplification and filtering. Each AAM 230 is connected to a sub level ABB 240. Thus the ABB sub module 240 is connected to several AAMs 230 and antenna sub panels 220; forming an antenna sub array 210 together.

The UL sub level ABB 240 may perform spatial detection of received uplink signal, n1r, for an antenna sub array 210 and select strongest paths, such as e.g. N1r, according to a predetermined or configurable criterion, e.g. exceeding a threshold value.

Further, In the uplink, the ABB processing unit 250 may perform a spatial analysis of the signals, N1r to Nnr, received from all antenna sub-arrays 210, and select the M strongest path from one, several or all antenna sub arrays 210.

The Rx pre-filter may in some embodiments be designed so that it isolates selected signals Mr, which may be sent to the equalizer. Further, the Tx pre-filter may be designed so that it is reciprocal from a baseband point of view. The TX filter may be done in two steps, or just at the ABB downlink part in different embodiments.

Downlink signals may be transmitted in the same spatial directions as the selected received signals and for the same antenna sub arrays 210 that are selected for the received uplink signals, in some embodiments.

Figure 4:
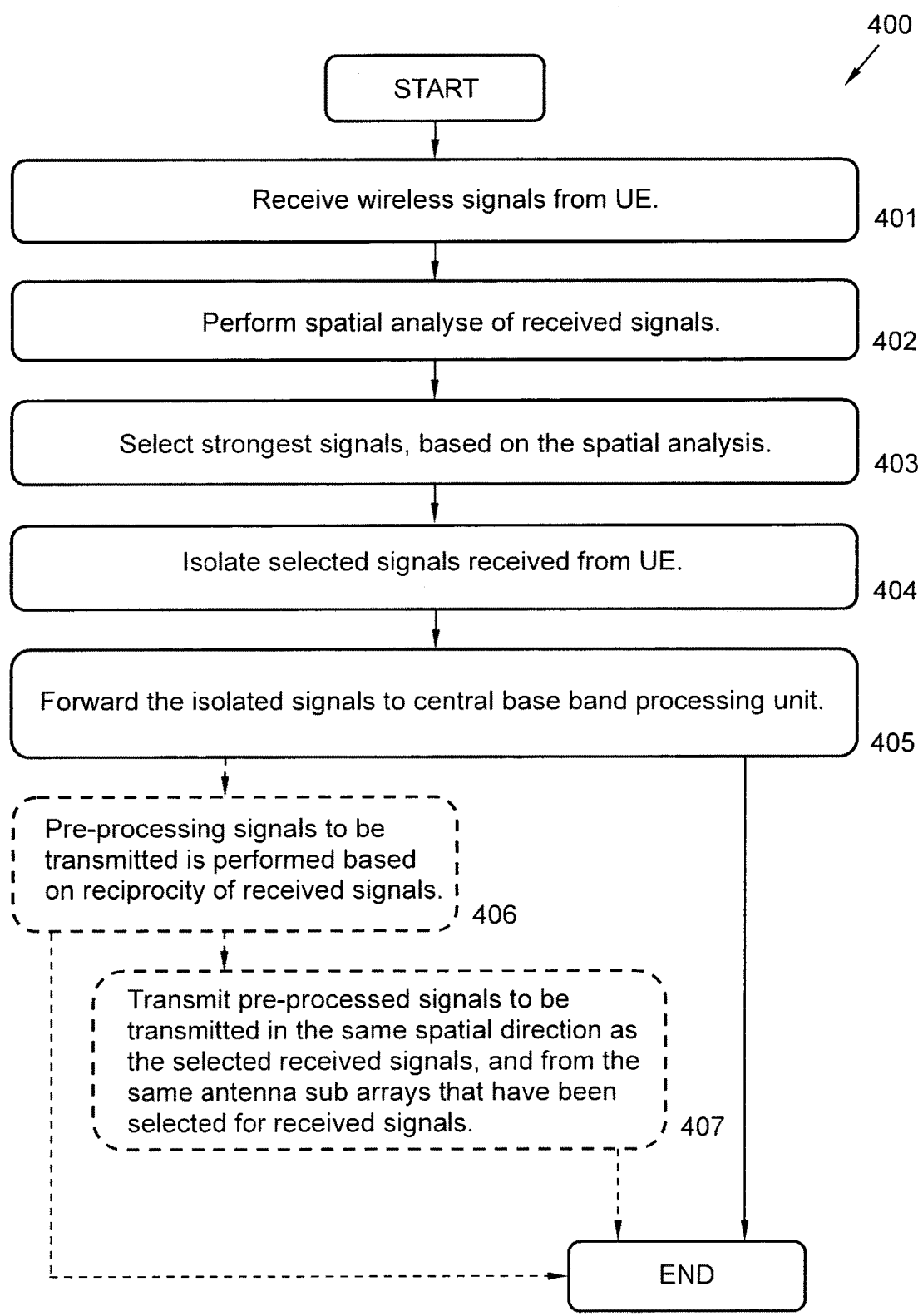
FIG. 4 is a flow chart illustrating a method in a radio network node according to an embodiment of the invention.

FIG. 4 is a flow chart illustrating embodiments of a method 400 in a radio network node 110, for wireless communication with a UE 120 in a wireless communication system 100 in antenna streams. The radio network node 110 comprises, or is connected to; a plurality of antenna sub arrays 220, forming a multiple antenna array 215 which is configured for beamforming, spatial multiplexing and MIMO transmission/reception. Also, the radio network node 110 comprises an antenna base band processing unit 250 and a central base band processing unit 260.

The multiple antenna array 215 comprises a multitude of antenna elements 220, such as e.g. hundred or more antenna elements 220 in some embodiments. The wireless communication system 100 thus may be configured for massive MIMO, according to some embodiments. The multitude of antenna elements may in some embodiments be mounted at a distance from each other, within the multiple antenna array 215, such that some, several or even all of the antenna elements may be able to receive the same signal from the UE 120.

The wireless communication network 100 may be based on 3GPP LTE. Further, the wireless communication system 100 may be based on FDD. The radio network node 110 may comprise an eNodeB according to some embodiments.

To appropriately communicate in antenna streams with the UE 120, the method 400 may comprise a number of actions 401-407.

It is however to be noted that any, some or all of the described actions 401-407, may be performed in a somewhat different chronological order than the enumeration indicates, be performed simultaneously or even be performed in reversed order. Further, it is to be noted that some actions may be performed in a plurality of alternative manners according to different embodiments, and that some actions, such as e.g. actions 406-407 may be performed only within some, but not necessarily all embodiments. The method 400 may comprise the following actions:

Action 401

Wireless signals are received from the user equipment 120.

The wireless signals may be uplink signals, received directly from the UE 120, or may be received indirectly from the UE 120 via scattering reflections. Further, the received wireless signals may be received from other UEs/signalling entities within range, and/or reflections of signals transmitted by other such UEs/signalling entities.

Action 402

The received 401 signals are spatially analysed in the antenna base band processing unit 250.

The spatial analysis of the received 401 signals may comprise a comparison of the received 401 signal strength/quality with a predetermined threshold value, or a predetermined number of directions in some embodiments. The signals having a signal strength exceeding the predetermined threshold value may then be selected. Further, in some embodiments, Fast Fourier Transformation (FFT) may be made on the received signals.

The UE 120 may in some embodiments be connected to the ABB processing unit 250 via different ABB sub modules 240, due to shadowing effects and other signal propagation disturbances. Thus the UE 120 may have several connections N1-Nn to the ABB processing unit 250, distributed via a plurality ABB sub modules 240 in some embodiments.

Action 403

The strongest signals from one, several or all antenna sub-arrays 220 are selected, based on the spatial analysis 402.

According to some embodiments, the signals having a signal strength/quality exceeding a predetermined threshold value may be selected.

Action 404

The selected 403 signals received 401 from the UE 120 are isolated.

Action 405

The isolated 404 signals are forwarded to the central base band processing unit 260.

Action 406

This action may be performed within some, but not necessarily all embodiments of the method 400.

Signals to be transmitted may be pre-processed, based on reciprocity of received 401 signals. Such pre-processing may be performed in the ABB processing unit 250, ABB sub module 240 and/or AAM 230 in different embodiments, based on a pre-filter design modelled on uplink signals.

Action 407

This action may be performed within some, but not necessarily all embodiments of the method 400.

The pre-processed 406 signals may be transmitted in the same spatial direction as the selected 403 received signals, and from the same antenna sub arrays 220 that have been selected for the received 401 signals.

The previously described actions 401-407 to be performed in the radio network node 110 may be implemented through the one or more processing circuits in the radio network node 110, together with computer program code for performing the functions of the actions 401-407. Thus a computer program product, comprising instructions for performing the actions 401-407 in the radio network node 110 may perform the method 400 for wireless communication with a UE 120 in a wireless communication system 100 in antenna streams, when the computer program product is loaded in one or more processing circuits of the radio network node 110.

The computer program product mentioned above may be provided for instance in the form of a data carrier carrying computer program code for performing any, at least some, or all of the actions 401-407 according to some embodiments when being loaded into the processing circuit. The data carrier may be, e.g., a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the radio network node 110 remotely, e.g., over an Internet or an intranet connection.

The terminology used in the detailed description of the embodiments as illustrated in the accompanying drawings is not intended to be limiting of the described method 400 and/or radio network node 110, which instead are limited by the enclosed claims.

As used herein, the term "and/or" comprises any and all combinations of one or more of the associated listed items. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof.

The invention claimed is:

1. A radio network node configured for wireless communication with a user equipment (UE) in antenna streams of a wireless communication system, the radio network node comprising:
   a plurality of antenna sub arrays forming a multiple antenna array which is configured for beamforming, spatial multiplexing and Multiple Input Multiple Output (MIMO) transmission/reception, wherein the multiple antenna array processes a plurality of physical antenna streams, and wherein a number of physical antenna streams of the plurality of physical antenna streams is defined as N;
   one or more processing circuits for performing central base band (CBB) processing; and
   one or more processing circuits for performing antenna base band (ABB) processing connected to the one or more processing circuits for performing CBB processing, wherein the one or more processing circuits for performing ABB processing comprises:
      a plurality of active antenna (AA) processing circuits, wherein:
         each AA processing circuit of the plurality of AA processing circuits is connected to a respective one antenna sub array of the plurality of antenna sub arrays,
         each AA processing circuit of the plurality of AA processing circuits is configured for pre-processing of signals over the respective one antenna sub array, before any forwarding of signals is made to the one or more processing circuits for performing CBB processing, and
         the pre-processing performed by the plurality of AA processing circuits comprises one or more of: analog/digital conversion, digital/analog conversion, carrier modulation/demodulation, transmission power amplification and filtering, or receiver low noise amplification and filtering; and
      a plurality of sub-level ABB processing circuits, wherein each sub-level ABB processing circuit of the plurality of sub-level ABB processing circuits is connected to the plurality of AA processing circuits and is connected to the respective one antenna sub array, and wherein the each sub-level ABB processing circuit is configured for:
         spatial detection of a received signal for the antenna sub array, and
         selecting strongest paths to the UE,
   wherein:
      before any forwarding of signals is made to the one or more processing circuits performing CBB processing, the one or more processing circuits for performing ABB processing maps a plurality of logical antenna streams to clusters of signals of the N physical antenna streams based on the pre-processing of signals by the plurality of AA processing circuits and based on the selected strongest paths to the UE,
      a number of logical antenna streams of the plurality of logical antenna streams is defined as M, and
      M is less than N.

2. The radio network node according to claim 1, wherein the one or more processing circuits for performing the ABB processing are connected to the plurality of sub-level ABB processing circuits, and wherein the one or more processing circuits for performing the ABB processing are configured for spatial analysis of the signals received from the plurality of antenna sub arrays.

3. The radio network node according to claim 1 further comprising an equalizer, wherein the pre-processing of received signals comprises isolating selected signals, which are transmitted to the equalizer.

4. The radio network node according to claim 1, wherein the pre-processing of signals to be transmitted is performed based on reciprocity of received signals.

5. The radio network node according to claim 1, wherein the multiple antenna array is configured for transmitting a signal in the same spatial direction as the selected received signals, and from the same antenna sub arrays that have been selected for the received signals.

6. The radio network node according to claim 1, wherein the radio network node comprises an evolved NodeB (eNodeB), and wherein the wireless communication network is based on 3rd Generation Partnership Project Long Term Evolution (3GPP LTE).

7. A method in a radio network node, for wireless communication with a user equipment (UE) in antenna streams of a wireless communication system, the radio network node including: a plurality of antenna sub arrays forming a multiple antenna array which is configured for beamforming, spatial multiplexing and Multiple Input Multiple Output (MIMO) transmission/reception; one or more processing circuits for performing central base band (CBB) processing; and one or more processing circuits for performing antenna base band (ABB) processing connected to the one or more processing circuits for performing CBB processing and connected to the plurality of antenna sub arrays, the method comprising the steps of:
   receiving and processing, by the multiple antenna array, a plurality of physical antenna streams, wherein a number of physical antenna streams of the plurality of physical antenna streams is defined as N;
   pre-processing, by each of a plurality of AA processing circuits of the one or more processing circuits for performing ABB processing, and before any forwarding of signals is made to the one or more processing circuits for performing CBB processing, signals over a respective one antenna sub array of the plurality of antenna sub arrays, the pre-processing comprising one or more of: analog/digital conversion, digital/analog conversion, carrier modulation/demodulation, transmission power amplification and filtering, or receiver low noise amplification and filtering;

spatially detecting, by a respective one of a plurality of sub-level ABB processing circuits of the one or more processing circuits for performing ABB processing, a received signal for the antenna sub array;

selecting, by the respective one sub-level ABB processing circuit, strongest paths to the UE;

mapping, by the one or more circuits for performing ABB processing and before any forwarding of signals is made to the one or more processing circuits for performing CBB processing, a plurality of logical antenna streams to clusters of signals of the N physical antenna streams based on the pre-processing of signals by the plurality of AA processing circuits and based on the selected strongest paths to the UE, wherein:

a number of logical antenna streams of the plurality of logical antenna streams is defined as M, and M is less than N; and forwarding the plurality of logical antenna streams to the one or more processing circuits performing the CBB processing.

8. The method according to claim 7, wherein the pre-processing step comprises pre-processing signals to be transmitted based on reciprocity of received signals, the method further comprising:

transmitting the pre-processed signals to be transmitted in the same spatial direction as the selected strongest signals, and from the same antenna sub arrays that have been selected for the strongest signals.

9. The method according to claim 7, further comprising spatially analyzing, by the one or more processing circuits for performing ABB processing, the signals received from the plurality of antenna sub arrays.

10. The radio network node according to claim 2, wherein, for the spatial analysis of the received signals, the one or more processing circuits for performing the ABB processing are further configured to compare a received signal strength with a predetermined threshold value or a predetermined number of directions, and wherein signals having a signal strength exceeding the predetermined threshold value are selected.

11. The radio network node according to claim 1, wherein the one or more processing circuits for performing the ABB processing are further configured for selecting the strongest path from at least one of the plurality of antenna sub arrays.

12. The radio network according to claim 1, wherein N is ten times greater than M.

13. The method according to claim 9, wherein the spatially analyzing step comprises a comparison of a received signal strength with a predetermined threshold value or a predetermined number of directions, and wherein signals having a signal strength exceeding the predetermined threshold value are selected.

14. The method according to claim 7 further comprising selecting, by the one or more processing circuits for performing ABB processing, the strongest path from at least one of the plurality of antenna sub arrays.

15. The method according to claim 7, wherein the radio network node further includes an equalizer, and wherein the pre-processing step comprises isolating selected signals, which are transmitted to the equalizer.

16. The method according to claim 7, wherein the radio network node includes an evolved NodeB (eNodeB), and wherein the wireless communication network is based on 3rd Generation Partnership Project Long Term Evolution (3GPP LTE).

17. The method according to claim 7, wherein N is ten times greater than M.

18. The method according to claim 7, wherein the mapping step comprises reducing an amount of data that is forwarded to the one or more processing circuits for the forwarding step.

* * * * *